United States Patent [19]
Nakashima et al.

[11] Patent Number: 5,278,106
[45] Date of Patent: Jan. 11, 1994

[54] INOGRANIC PARTICULATE MATERIAL COMPRISING FINE BALLS OF UNIFORM SIZE AND PROCESS FOR PRODUCING SAME

[75] Inventors: Tadao Nakashima, Miyazaki; Masato Kukizaki; Masataka Shimizu, all of Miyazaki; Yoshiko Nakahara, Ikeda; Hiroyuki Kageyama, Toyonaka; Fujiya Nakahara, Ikeda; Masaaki Mizuguchi, Ashiya, all of Japan

[73] Assignees: Shunzo Ishihara, Tokyo; Suzuki Yuhi Industries, Co., Ltd., Osaka; Suketaka Matsukata, Miyazaki, all of Japan

[21] Appl. No.: 774,978

[22] Filed: Oct. 15, 1991

[30] Foreign Application Priority Data

Oct. 16, 1990 [JP] Japan .................................. 2-277507

[51] Int. Cl.⁵ .............................................. C03C 3/00
[52] U.S. Cl. .................................. 501/12; 252/315.1; 501/80
[58] Field of Search ...................... 501/12, 80; 264/41; 252/315.1

[56] References Cited

U.S. PATENT DOCUMENTS

4,927,560  5/1990  Osaka et al. ....................... 252/315.1
4,931,414  6/1990  Wood et al. ......................... 501/103
5,077,241  12/1991 Moh et al. ............................ 501/84

*Primary Examiner*—Mark L. Bell
*Assistant Examiner*—A. Wright
*Attorney, Agent, or Firm*—Armstrong, Westerman, Hattori, McLeland & Naughton

[57] ABSTRACT

An inorganic particulate material comprising fine balls approximately uniform in size and 0.1 to 50 μm in mean particle size and prepared by admixing an aqueous solution of at least one compound (i) selected from among halides of alkaline earth metals, inorganic acids, organic acids, ammonium salts or inorganic acids, ammonium salts of organic acids and carbonates of alkali metals with an aqueous solution of at least one inorganic compound (ii) selected from among silicates, carbonates, phosphates or sulfates of alkali metals, halides of alkaline earth metals, and sulfates, hydrochlorides or nitrates of copper family elements o iron family elements before or after admixing an organic solvent (iii) with said aqueous solution of at least one inorganic compound (ii) to form a W/O emulsion, said compound (i) being capable of forming a water-insoluble precipitate when subjected to an aqueous solution reaction with said inorganic compound (ii).

3 Claims, 5 Drawing Sheets

INOGRANIC PARTICULATE MATERIAL COMPRISING FINE BALLS OF UNIFORM SIZE AND PROCESS FOR PRODUCING SAME

BACKGROUND OF THE INVENTION

1. Field of the Invention

The present invention relates to a process for producing an inorganic particulate material in the form of fine balls of uniform size, and more particularly to a process for producing such inorganic particulate material utilizing a solution reaction.

The inorganic particulate material obtained by the process of the invention comprises porous or nonporous fine balls which are uniform in size. Since the present material is substantially uniform in particle size, it is usable as a sustained-release inorganic microcapsule film material for enclosing perfumes, dyes, disinfectants, insecticides, repellents for insects and animals, vitamins, foods, nutrients, medicinals, deodorants, adhesives, liquid crystals, etc. in a wide variety of applications.

The present material is useful also as an extender pigment, for example, in the fields of cosmetics, coating compositions, plastics, inks, and agents for preventing adhesion of films.

Moreover, pigments, dyes or like coloring substances can be enclosed with the present material to form colored fine balls of uniform size, so that the material produces excellent effects when used as an additive for cosmetics, inks and plastics.

The material is expected to exhibit outstanding properties for use as a filler for high-performance chromatographs and gas chromatographs, magnetic tape and catalyst, and is also usable for spacers for liquid crystals.

2. Description of the Prior Art

Processes are already known for preparing inorganic particulate materials comprising porous fine balls with use of solutions, as disclosed, for example, in Examined Japanese Patent Publications SHO 54-6251 and SHO 57-55454.

These conventional processes consist essentially of mixing together an aqueous solution of water-soluble inorganic compound and an organic solvent to prepare a W/O emulsion, and subsequently mixing the emulsion with an aqueous solution capable of forming a water-insoluble precipitate when reacted with the water-soluble inorganic compound to produce porous fine balls of inorganic material.

Although the process described is an excellent process for producing an inorganic particulate material in the form of fine porous balls, the process has the tendency for the particles obtained to vary in size and encounters difficulty in preparing fine balls of substantially uniform size.

On the other hand, various processes are known for preparing emulsions. Recently developed is a process for producing an emulsion using a micro porous membrane as disclosed in Unexamined Japanese Patent Publication HEI 2-95433.

With this process, a liquid serving as the dispersed phase is forced into a liquid for providing the continuous phase through the micro porous membrane having pores of uniform diameter to obtain an emulsion.

We have conducted research on processes wherein the solution reaction is utilized for preparing porous inorganic particulate materials in order to overcome the above drawback.

During the research, we conceived the entirely novel idea that the emulsion producing technique using the micro porous membrane would be applicable to the preparation of such an inorganic particulate material. We have carried out further research based on this novel idea.

SUMMARY OF THE INVENTION

Accordingly, the main object of the present invention is to overcome the foregoing drawback of the prior art, that is, to develop a process for producing an inorganic particulate material comprising fine balls of approximately uniform size using a micro porous membrane.

The above object is fulfilled by a process for producing an inorganic particulate material in the form of fine balls by admixing an aqueous solution of at least one compound (i) selected from among halides of alkaline earth metals, inorganic acids, organic acids, ammonium salts of inorganic acids, ammonium salts of organic acids and carbonates of alkali metals with an aqueous solution of at least one inorganic compound (ii) selected from among silicates, carbonates, phosphates or sulfates of alkali metals, halides of alkaline earth metals, and sulfates, hydrochlorides or nitrates of copper family elements or iron family elements before or after admixing an organic solvent (iii) with said aqueous solution of at least one inorganic compound (ii) to form a W/O emulsion, said compound (i) being capable of forming a water-insoluble precipitate when subjected to an aqueous solution reaction with said inorganic compound (ii), the process being characterized in that said aqueous solution of at least one inorganic compound (ii) is forced into said organic solvent (iii) through a micro porous membrane having micropores of uniform diameter and rendered hydrophobic.

Our research has revealed that when the micro porous membrane having micropores of uniform diameter used for forcing the aqueous solution of inorganic compound (ii) into the organic solvent (iii) is a membrane subjected to a treatment for making the membrane hydrophobic, the aqueous solution can be forced into the organic solvent to provide an emulsion which is uniform in particle size, consequently giving the desired product comprising fine balls of approximately uniform size. The present invention has been accomplished based on this novel discovery.

DESCRIPTION OF THE PREFERRED EMBODIMENTS

The essential features of the present invention are:
(a) To basically use a conventional solution reaction for producing an inorganic particulate material comprising porous fine balls.

(b) To use a micro porous membrane having micropores of uniform diameter as means for preparing a W/O emulsion in the process.

(c) To use the micro porous membrane after it has been rendered hydrophobic by a pre-treatment According to the present invention wherein a W/O emulsion is prepared, use of a mere micro porous membrane fails to produce an emulsion wherein the suspended particles are minute and uniform in size, whereas the micro porous membrane, when used as rendered hydrophobic, provides a W/O emulsion constituted of minute particles of substantially uniform size.

The above features will be described in the order mentioned.

The conventional reaction (a), which can be practiced as it is, is for example the one disclosed in Examined Japanese Patent Publication SHO 54-6251 or SHO 57-55454.

Stated more specifically, an aqueous solution is prepared which contains at least one inorganic compound at a concentration of 0.3 mole/liter to saturation, the compound being selected from among silicates, carbonates, phosphates or sulfates of alkali metals, halides of alkaline earth metals, and sulfates, hydrochlorides or nitrates of copper family elements or iron family elements.

Next, an organic solvent having a solubility in water preferably of up to 5% is admixed with the aqueous solution to prepare a W/O emulsion. A micro porous membrane made hydrophobic is sued in this step.

Subsequently, an aqueous solution of at least one compound selected from among halides of alkaline earth metals, inorganic acids, organic acids, ammonium salts of inorganic acids, ammonium salts of organic acids and carbonates of alkali metals which are capable of forming a water-insoluble precipitate when subjected to an aqueous solution reaction with the inorganic compound is prepared. This aqueous solution concentration of 0.05 mole/liter to saturation, preferably 0.1 to 2.0 moles/liter. This aqueous solution is admixed with the W/O emulsion in an amount of 100 parts by weight per 100 parts by weight of the emulsion.

Consequently, an inorganic particulate material is obtained which comprises fine balls of uniform size.

The uniformity of particle sizes of the inorganic particulate material was evaluated in terms of the dispersion $\epsilon$ of particle sizes represented by the following equation:

$$\epsilon = (D90 - D10)/D50$$

wherein D10, D50 and D90 are particle sizes corresponding to cumulative amounts of 10%, 50% and 90% on a cumulative particle size curve obtained by determining the distribution of sizes of the particles formed by centrifugal sedimentation absorptiometry.

$\epsilon = 0$ means no dispersion. The greater the value $\epsilon$, the greater the dispersion.

According to the present invention, the particulate material is evaluated as being approximately uniform in particle size when $\epsilon$ is smaller than about 1.3. If the value is greater, the particles are interpreted as being of varying sizes.

Examples of preferred organic solvents which are up to 5% in solubility in water are as follows.

Aliphatic hydrocarbons:
n-Hexane, isohexane, n-heptane, isoheptane, n-octene, iso-octene, gasoline, petroleum ether, kerosene, benzine, mineral spirit and the like.

Alicyclic hydrocarbons:
Cyclopentane, cyclohexane, cyclohexene, cyclononane and the like.

Aromatic hydrocarbons:
Benzene, toluene, xylene, ethylbenzene, propylbenzene, cumene, mesitylene, tetralin, styrene and the like.

Ethers: Propyl ether, isopropyl ether and the like.

Chlorohydrocarbons
Methylene chloride, chloroform, ethylene chloride, trichloroethane, trichloroethylene and the like.

Esters:
Ethyl acetate, n-propyl acetate, isopropyl acetate, n-butyl acetate, isobutyl acetate, n-amyl acetate, iso-amyl acetate, butyl lactate, methyl propionate, ethyl propionate, butyl propionate, methyl butyrate, ethyl butyrate, butyl butyrate and the like.

These organic solvents are usable singly, or at least two of them can be used in admixture.

The W/O emulsion to be prepared has a W/O ratio of 4/1 to 1/5, preferably about 2/1 to about 1/2. Surfactants are used in an amount of up to about 10 wt. %, preferably about 0.1 to about 3 wt. %, of the organic solvent.

Nonionic surfactants are used. Examples of preferred surfactants are as follows.

Polyoxyethylene sorbitan fatty acid esters:
Polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, polyoxyethylene sorbitan stearate and the like.

Polyoxyethylene higher alcohol ethers:
Polyoxyethylene lauryl ether, polyoxyethylene cetyl ether, polyoxyethylene stearyl ether, polyoxyethylene oleyl ether, polyoxyethylene octyl phenol ether, polyoxyethylene nonyl phenol ether and the like.

Polyoxyethylene fatty acid esters:
Polyoxyethylene glycol monolaurate, polyoxyethylene glycol monostearate, polyoxyethylene glycol stearate, polyoxyethylene glycol monooleate and the like.

Glycerin fatty acid esters:
Stearic acid monoglyceride, oleic acid monoglyceride and the like.

Polyoxyethylene sorbitol fatty acid esters:
Tetraoleic acid polyoxyethylene sorbitol and the like.

Among these surfactants, polyoxyethylene sorbitan fatty acid esters are especially preferable. These surfactants are used singly, or at least two of them are used in admixture.

According to the present invention, the basic process includes various conventional methods of causing the fine balls of inorganic particulate material to support pigments, coloring substances, perfumes, microorganisms or the like.

Further according to the present invention, the basic process (a) includes the process disclosed in Unexamined Japanese Patent Publication SHO 63-25864 for producing a hollow inorganic particulate material.

This process comprises admixing an organic solvent with an aqueous solution containing at least one inorganic compound selected from among silicates, carbonates, phosphates or sulfates of alkali metals, halides of alkaline earth metals, and sulfates, hydrochlorides or nitrates of copper family elements or iron family elements to prepare a W/O emulsion, and subsequently admixing with the emulsion an aqueous solution of a compound selected from among halides of alkaline earth metals, inorganic acids, organic acids, ammonium salts of inorganic acids, ammonium salts of organic acids and carbonates of alkali metals and capable of forming a water-insoluble precipitate when subjected to an aqueous solution reaction with the inorganic compound to prepare an inorganic particulate material comprising fine balls of approximately uniform size, the process being characterized by:

(A) admixing an organic solvent containing a hydrophilic surfactant with the aqueous solution of inorganic compound to prepare an O/W emulsion, (B) admixing the O/W emulsion obtained with an organic solvent containing a hydrophilic surfactant to obtain an O/W/O emulsion, and (C) subsequently admixing the O/W/O emulsion obtained by the step (B) with the aqueous solution of the compound capable of forming a water-insoluble precipitate by the aqueous solution reaction, whereby a hollow inorganic particulate material of fine balls is produced. A micro porous membrane is used for preparing at least the emulsion in the step (B), preferably for preparing both the emulsions in the steps (A) and (B).

The micro porous membrane to be used for preparing the W/O emulsion in the above process must be one subjected to a treatment for making the membrane hydrophobic. The O/W emulsion is prepared using a micro porous membrane not rendered hydrophobic.

Next, the features (b) and (c) of the invention will be described.

Useful in feature (b) are basically the method disclosed in Unexamined Japanese Patent Publication HEI 2-95433 and the micro porous membrane used in this method.

However, the micro porous membrane for use in the present invention is rendered hydrophobic before use. Useful micro porous membranes are those having micropores which are uniform in diameter. The pore diameter is suitably determined in accordance with the particle size of the desired product, i.e., fine balls.

Stated more specifically, desirable micro porous membranes for use in the invention are as follows.

(1) Membranes having micropores extending therethrough, uniform in diameter and as small as possible in the distribution of pore diameters.

(2) Membranes having micropores which are adjustable to the desired diameter (usually about 0.1 to about 10 $\mu m$).

(3) Membranes having a sufficient mechanical strength against deformation or breaking when the liquid to be made into the dispersed phase is forced into the liquid serving as the continuous phase.

(4) Membranes having chemical resistance to the liquids forming the emulsion.

Micro porous membranes having such characteristics are those made of inorganic material or organic material and are not limited specifically. Examples of useful membranes are those made of the $CaO-B_2O_3-SiO_2-Al_2O_3$ porous glass disclosed in Examined Japanese Patent Publication SHO 62-25618, those made of the $CaO-B_2O_3-SiO_2-Al_2O_3-Na_2O$ porous glass and $CaO-B_2O_3-SiO_2-Al_2O_3-Na_2O-MgO$ porous glass disclosed in Unexamined Japanese Patent Publication SHO 61-40841 (U.S. Pat. No. 4,657,875), etc. These porous glasses have the feature that the pores are controlled to a very narrow range of diameters and are circular in cross section. Although the membrane is not limited specifically in thickness, the thickness is preferably about 0.4 to about 2 mm in view of strength, etc.

The method of making the micro porous membrane hydrophobic is not limited specifically insofar as the membrane is rendered so hydrophobic that the W/O emulsion can be prepared with use of the membrane.

To make the micro porous membrane hydrophobic, a hydrophobicity-imparting agent is applied to the entire surface of the membrane and caused to be chemically absorbed by the membrane or to physically form a hydrophobic film over the membrane. Different kinds of such agents are usable in combination. The membrane is made hydrophobic to the desired extent insofar as the agent will not close the micropores and will not separate off the membrane during the preparation of the W/O emulsion.

Examples of preferred hydrophobicity-imparting agents are dimethylpolysiloxane, methylhydrogenpolysiloxane and like thermosetting silicone oils, silicone emulsion, silicone resin and like resins, methyltrimethoxysilane, hexamethyldisilane, vinyltrimethoxysilane, trimethylchlorosilane and like silane coupling agents, dihydrogenhexamethylcyclotetrasiloxane, trihydrogenpentamethylcyclotetrasiloxane and like cyclic silicone compounds, isopropyltristearoyl titanate, isopropyltri (N-aminoethyl) titanate and like titanate coupling agents, acetoalkoxyaluminum diisopropylate and like aluminum coupling agents, fluorosilicone coating agent, fluorine-containing coating agent, etc. Some of these agents are usable in combination.

Although extreme difficulties have heretofore been encountered in preparing inorganic particulate materials comprising fine balls of approximately uniform size, such materials can be produced by the process of the invention utilizing a solution reaction.

EXAMPLES

The present invention will be described in greater detail with reference to the following examples.

EXAMPLE 1

A hollow cylindrical micro porous membrane of glass, 1.05 $\mu m$ in micropore diameter, was dried at 110° C. for 24 hours and thereafter dipped in a 10 wt. % toluene solution of trimethylchlorosilane at room temperature for treatment with the silane coupling agent and was thereby made hydrophobic.

Figure 1:
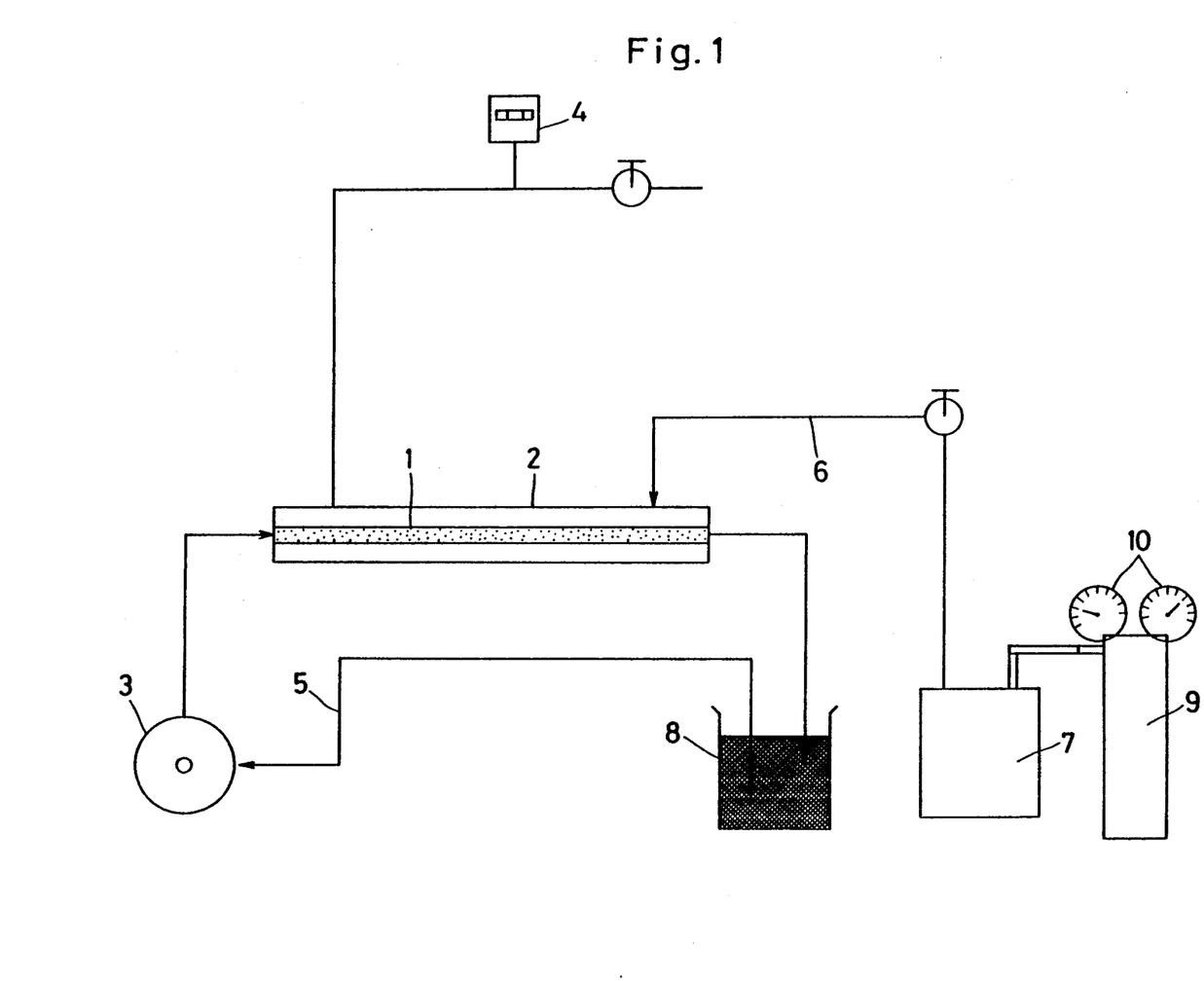
FIG. 1 is a diagram schematically showing an apparatus for use in practicing the process of the invention.

The hydrophobic micro porous membrane was installed in the apparatus shown in FIG. 1. Using the apparatus, water glass No. 3 (4 moles/liter calculated as $SiO_2$) was forced through the membrane into 800 ml of hexane solution of 20 g/liter of polyoxyethylene (20) sorbitan trioleate as a continuous phase for 1 hour under a nitrogen gas pressure of 0.4 kgf/cm² to prepare a W/O emulsion. The reference numerals given in FIG. 1 represent the following components.

1: Cylindrical micro porous glass membrane
2: Module
3: Pump
4: Pressure gauge
5: O-phase (oil phase) line
6: W-phase (water phase) line
7: W-phase (water phase) line
8: O-phase (oil phase) line
9: Pressurizing gas cylinder
10: Pressure gauge The emulsion was added to and reacted with 1 liter of a previously prepared ammonium bicarbonate solution having a concentration of 1.5 moles/liter, followed by standing for 2 hours and filtration. The cake filtered off was washed with water and then with methanol and thereafter dried at 110° C. for 24 hours.

The above procedure gave a porous particulate silica in the form of fine balls which were approximately uniform in size and 3.47 μm in mean size.

Figure 2:
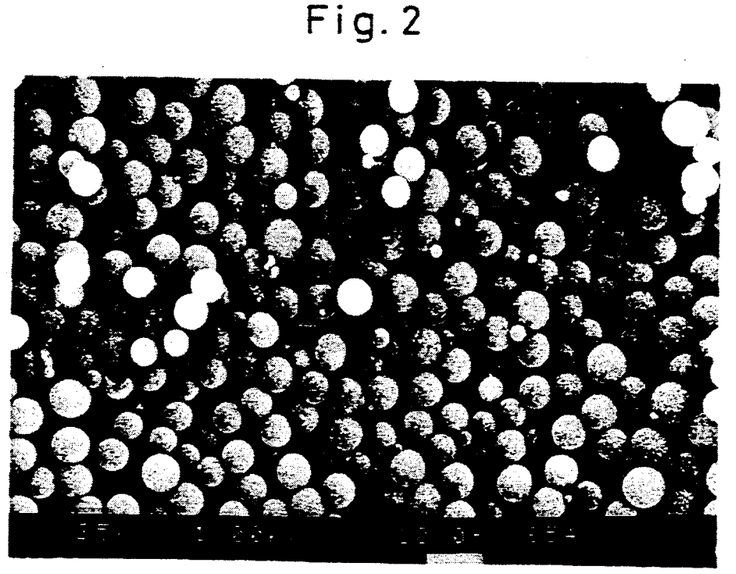
FIGS. 2 and 4 are scanning electron photomicrographs showing particulate materials of the invention.
Figure 3:
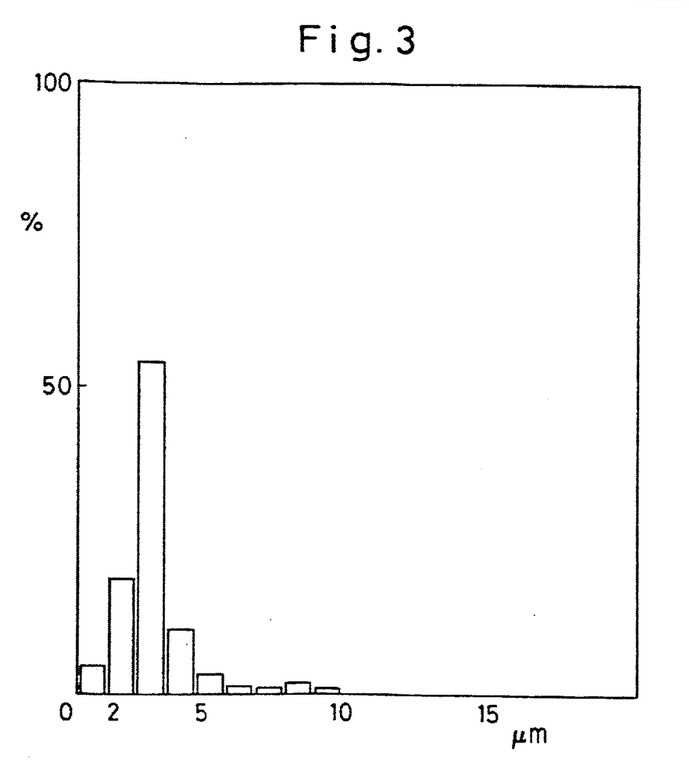
FIGS. 3 and 5 are particle size distribution diagrams of the materials of FIGS. 2 and 4, respectively.

FIG. 2 is a scanning electron photomicrograph of the particulate silica (×1000), and FIG. 3 shows the particle size distribution of the silica.

D10=2.25, D50=3.47, D90=4.99.

Dispersion $\epsilon = (4.99-2.25)/2.76 = 0.79$.

EXAMPLE 2

A hollow cylindrical micro porous glass membrane, 0.28 μm in micropore diameter, was dried at 110° C. for 24 hours, thereafter dipped in a 10 wt. % toluene solution of silicone resin (SR-2410, product of Toray Dow Corning Silicone Co., Ltd.) at room temperature, dried at 110° C. for 24 hours and thus coated with the silicone resin, whereby the membrane was made hydrophobic.

In the same manner as in Example 1, the hydrophobic micro porous membrane was installed in the apparatus of FIG. 1, and using the apparatus, water glass No. 3 (4 moles/liter calculated as $SiO_2$) was forced through the membrane into 800 ml of toluene solution of 15 g/liter of sorbitan monolaurate as a continuous phase for 1 hour under a nitrogen gas pressure of 2.0 kgf/cm² to prepare a W/O emulsion.

The emulsion was added to and reacted with 1 liter of a previously prepared ammonium sulfate solution having a concentration of 3.0 moles/liter, followed by standing for 2 hours and filtration. The cake separated off was washed with water and then with methanol and thereafter dried at 110° C. for 24 hours, consequently affording a porous particulate silica in the form of fine balls which were approximately uniform in size and 1.21 μm in mean size.

Figure 4:
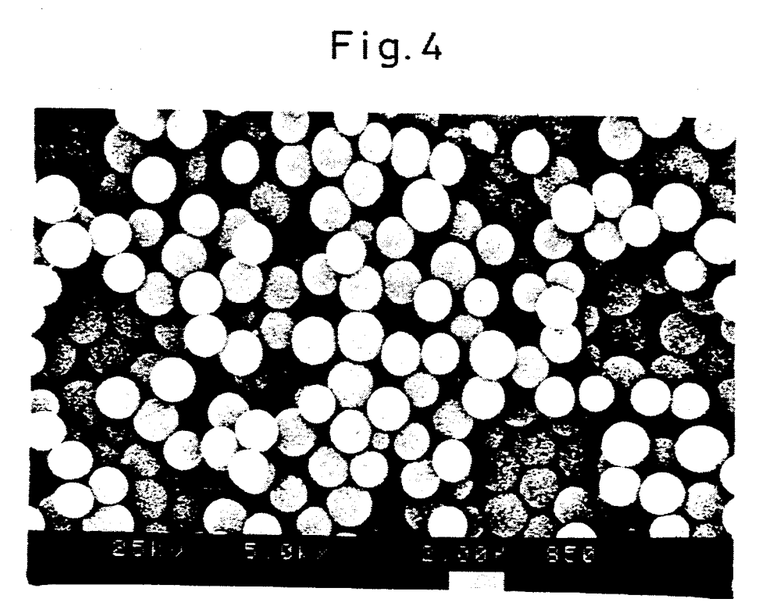
Figure 5:
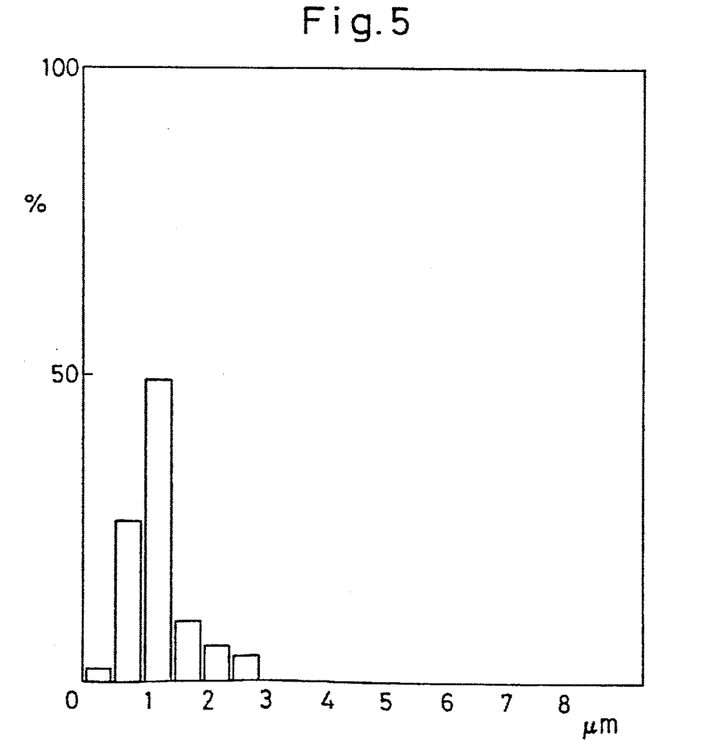

FIG. 4 is a scanning electron photomicrograph of the particulate silica, and FIG. 5 shows the particle size distribution of the silica.

D10=0.64, D50=1.21, D90=2.05.

Dispersion $\epsilon = (2.05-0.64)/1.21 = 1.17$.

EXAMPLE 3

A hollow cylindrical micro porous glass membrane, 1.10 μm in micropore diameter, was dried at 110° C. for 24 hours, thereafter dipped in a fluorosilicone coating agent (KP-801M, product of Shin-Etsu Chemical Co., Ltd.) at room temperature, dried at 110° C. for 24 hours and thus formed with a fluorosilicone coating, whereby the membrane was made hydrophobic.

To 500 ml of water glass No. 3 (6.5 moles/liter calculated as $SiO_2$) was added 100 ml of kerosene solution of 10 g/liter of polyoxyethylene (n=10) nonyl phenyl ether, and the mixture was stirred at a high speed by a homogenizer to prepare an O/W emulsion.

In the same manner as in Example 1, the hydrophobic micro porous membrane was installed in the apparatus of FIG. 1, and using the apparatus, the emulsion was forced through the membrane into 800 ml of toluene solution of 15 g/liter of sorbitan monolaurate as a continuous phase for 1 hour under a nitrogen gas pressure of 0.8 kgf/cm² to prepare a O/W/O emulsion.

The emulsion was added to and reacted with 2 liters of a previously prepared potassium chloride solution having a concentration of 1.5 moles/liter. The reaction mixture was allowed to stand for 6 hours and filtered. The cake separated off was washed with water and then with methanol and thereafter dried at 110° C. for 24 hours, consequently affording a particulate calcium silicate in the form of hollow porous fine balls which were approximately uniform in size and 3.50 μm in mean size.

EXAMPLE 4

A hollow cylindrical micro porous glass membrane, 1.10 μm in micropore diameter, was dried at 110° C. for 24 hours, thereafter dipped in a 10 wt. % aqueous solution of water-soluble organosilicon resin (KP-18C, product of Shin-Etsu Chemical Co., Ltd.) at room temperature, dried at 110° C. for 24 hours and thus coated with the silicone resin, whereby the membrane was made hydrophobic.

In the same manner as in Example 1, the hydrophobic micro porous membrane was installed in the apparatus of FIG. 1, and using the apparatus, an aqueous solution of 2.5 moles/liter of nickel sulfate was forced through the membrane into 800 ml of toluene solution of 15 g/liter of sorbitan monooleate as a continuous phase for 1 hour under a nitrogen gas pressure of 0.38 kgf/cm² to prepare a W/O emulsion.

The emulsion was added to and reacted with 500 ml of a previously prepared potassium hydrogencarbonate aqueous solution having a concentration of 3.0 moles/liter, followed by standing for 2 hours and filtration. The cake separated off was washed with water and then with methanol and thereafter dried at 110° C. for 24 hours, consequently giving a basic particulate nickel carbonate in the form of porous balls which were approximately uniform in size and 2.86 μm in mean size.

The product was further heated in air at 500° C. for 24 hours to obtain a particulate nickel oxide in the form of porous fine balls which were approximately uniform in size.

EXAMPLE 5

A hollow cylindrical micro porous glass membrane, 2.00 μm in micropore diameter, was dried at 110° C. for 24 hours, thereafter dipped in a 5 wt. % hexane solution of silicone resin (SR-2405, product of Toray Dow Corning Silicone Co., Ltd.) at room temperature, dried at 110° C. for 24 hours and thus coated with the silicone resin, whereby the membrane was made hydrophobic.

In the same manner as in Example 1, the hydrophobic micro porous membrane was installed in the apparatus of FIG. 1. A 200 ml quantity of commercial water glass No. 3 (4 moles/liter calculated as $SiO_2$) was dissolved in 300 ml of ion-exchanged water, and the water glass solution was maintained at a temperature of up to 20° C. and admixed in small portions with 400 ml of dilute sulfuric acid with ice cooling. Using the apparatus with ice cooling, the mixture was forced through the membrane into 1000 ml of toluene solution of 15 g/liter of sorbitan monolaurate as a continuous phase for 30 minutes under a nitrogen gas pressure of 0.2 kgf/cm² to prepare a W/O emulsion.

The emulsion was maintained at room temperature for 10 minutes with stirring, then gradually heated to about 50° C. with continued stirring and thereafter allowed to gel over a period of about 5 hours.

The gel was filtered, and the cake separated off was washed with water and then with methanol and dried at 110° C. for 24 hours, affording a particulate silica gel comprising porous balls which were approximately uniform in size and 6.02 μm in mean size.

EXAMPLE 6

A hollow cylindrical micro porous glass membrane, 10.00 μm in micropore diameter, was dried at 110° C. for 24 hours, thereafter dipped in a 10 wt. % aqueous solution of water-soluble organosilicon resin (KP-18C, product of Shin-Etsu Chemical Co., Ltd.) at room temperature, dried at 110° C. for 24 hours and thus coated with the silicone resin, whereby the membrane was made hydrophobic.

In the same manner as in Example 1, the hydrophobic micro porous membrane was installed in the apparatus of FIG. 1, and using the apparatus, a dispersion of 60 g of titanium oxide (JR-801, product of Teikoku Kako Co., Ltd.) in 500 ml of water glass No. 3 (4 moles/liter calculated as $SiO_2$) prepared by a homo disper was forced through the membrane into 800 ml of kerosene solution of 15 g/liter of sorbitan monooleate as a continuous phase for 20 minutes under a nitrogen gas pressure of 0.1 kgf/cm$^2$ to prepare a W/O emulsion.

The emulsion was added to and reacted with 1 liter of a previously prepared ammonium solution having a concentration of 1.5 moles/liter, followed by standing for 2 hours and filtration. The cake separated off was washed with water and then with methanol and thereafter dried at 110° C. for 24 hours, consequently giving colored spherical fine silica particles having 25% of titanium oxide enclosed therein, approximately uniform in size and 21.4 μm in mean size.

REFERENCE EXAMPLE 1

According to a conventional process wherein solutions are utilized for preparing an inorganic particulate material comprising porous fine balls, e.g., according to the process disclosed in Examined Japanese Patent Publication SHO 54-6251 or SHO 57- 55454, 200 ml of water glass No. 3 (4 moles/liter calculated as $SiO_2$) was added to 600 ml of hexane solution of 20 g/liter of polyoxyethylene (20) sorbitan trioleate placed in a 1 liter beaker and serving as a continuous phase, followed by stirring at a high speed of 8000 r.p.m. for 1 minute by a homogenizer to prepare a W/O emulsion.

The emulsion was added to and reacted with 1 liter of a previously prepared ammonium bicarbonate solution having a concentration of 1.5 moles/liter, followed by standing for 2 hours and filtration. The cake separated off was washed with water and then with methanol and dried at 110° C. for 24 hours.

The above procedure gave a particulate silica in the form of porous fine balls which were not uniform in size and 3.35 μm in mean particle size.

Figure 6:
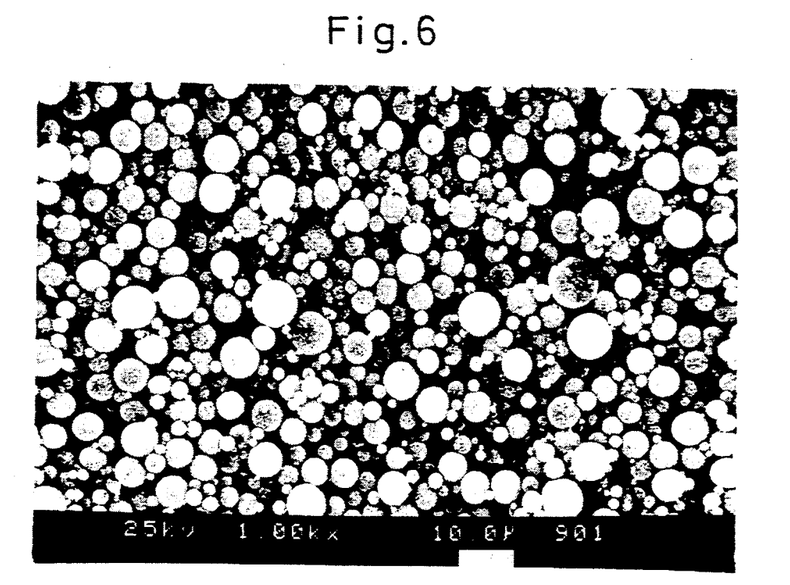
FIGS. 6 and 8 are scanning electron Photomicrographs showing particulate materials prepared by processes other than the process of the invention.
Figure 7:
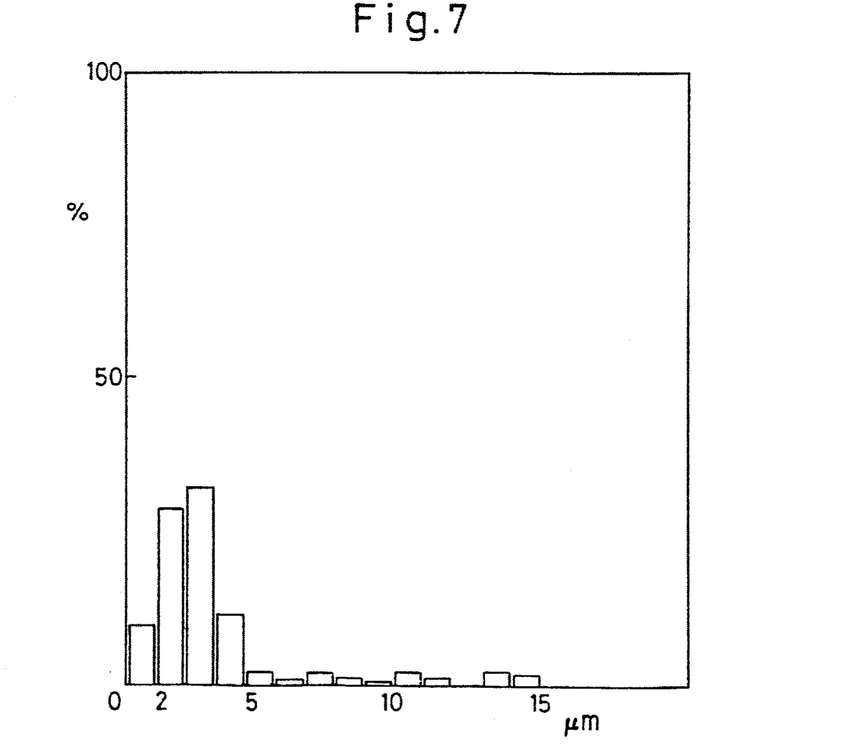
FIGS. 7 and 9 are particle size distribution diagrams of the materials of FIGS. 6 and 8, respectively.

FIG. 6 is a scanning electron photomicrograph of the silica, and FIG. 7 shows the particle size distribution thereof.

D10=2.01, D50=3.35, D90=9.23.
Dispersion $\epsilon = (9.23 - 2.01)/3.35 = 2.16$.

REFERENCE EXAMPLE 2

A hollow cylindrical micro porous glass membrane, 1.05 μm in micropore diameter, was dried at 110° C. for 24 hours and thereafter installed in the apparatus of FIG. 1 as in Example 1 without rendering the membrane hydrophobic in any way. Using the apparatus, water glass No. 3 (4 moles/liter calculated as $SiO_2$) was forced through the membrane into 800 ml of hexane solution of 20 g/liter of polyoxyethylene (20) sorbitan trioleate as a continuous phase for 20 minutes under a nitrogen gas pressure of 0.1 kgf/cm$^2$ to prepare a W/O emulsion.

The emulsion was added to and reacted with 1 liter of ammonium bicarbonate solution having a concentration of 1.5 moles/liter and prepared in advance. The reaction mixture was allowed to stand for 2 hours and filtered. The cake separated off was washed with water and then with methanol and thereafter dried at 110° C. for 24 hours.

The above procedure afforded a particulate silica comprising porous fine balls greatly varying in size and having mean particle size of 5.35 μm.

Figure 8:
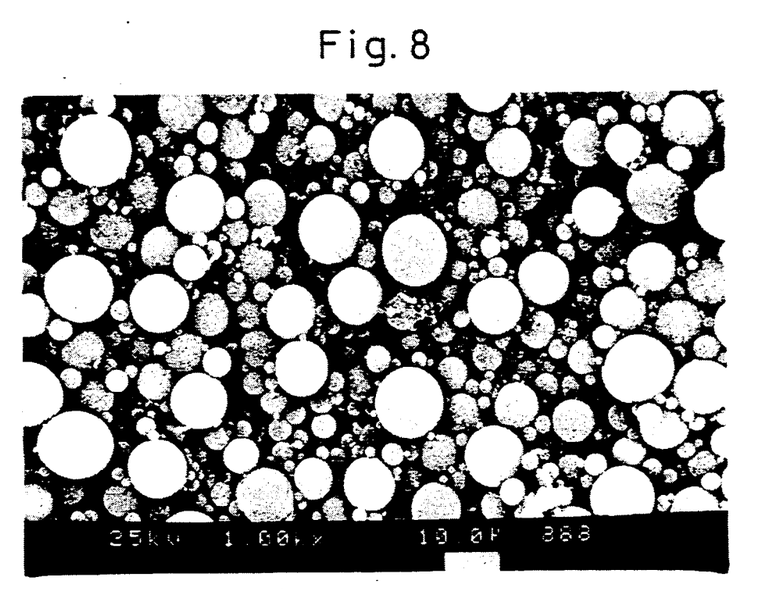
Figure 9:
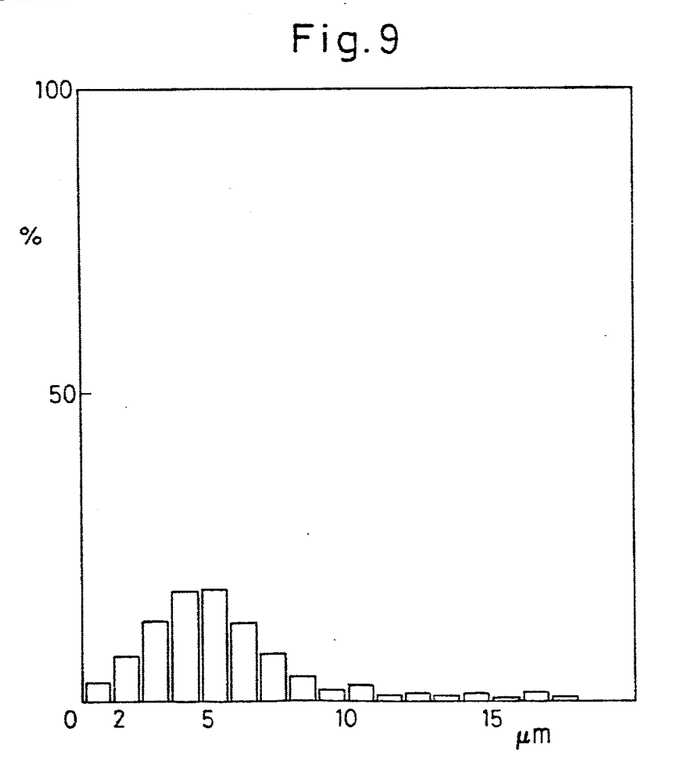

FIG. 8 is a scanning electron photomicrograph of the silica, and FIG. 9 shows the particle size distribution thereof.

D10=2.83, D50=5.35, D90=10.35.
Dispersion $\epsilon = (10.35 - 2.83)/5.35 = 1.41$.

What is claimed is:

1. A process for producing inorganic sphere having a uniform sphere size distribution comprising the steps of:
    a) providing a first aqueous solution comprising water and at least one compound of the group consisting of halides of alkaline earth metals, inorganic acids, organic acids, ammonium salts of inorganic acids, ammonium salts of organic acids, and carbonates of alkali metals;
    b) providing a second aqueous solution comprising water and at least one compound of the group consisting of silicates, carbonates, phosphates or sulfates of alkali metals, halides of alkaline earth metals, and sulfates, hydrochlorides or nitrates of copper family elements or iron family elements, wherein the compound of the second aqueous solution forms a water-insoluble precipitate when reacted with the compound of the first aqueous solution;
    c) rendering a microporous membrane hydrophobic
    d) forming a water-in-oil emulsion by passing the second aqueous solution through the hydrophobic microporous membrane into at least one organic solvent; and
    e) mixing the first aqueous solution with the water-in-oil emulsion, whereby the uniform size inorganic spheres are formed.

2. A process for producing hollow inorganic spheres having a uniform sphere size distribution comprising the steps of:
    a) providing a first aqueous solution comprising water and at least one compound of the group consisting of halides of alkaline earth metals, inorganic acids, organic acids, ammonium salts of inorganic acids, ammonium salts of organic acids, and carbonates of alkali metals;
    b) providing a second aqueous solution comprising water and at least one compound of the group consisting of silicates, carbonates, phosphates or sulfates of alkali metals, halides of alkaline earth metals, and sulfates, hydrochlorides or nitrates of copper family elements or iron family elements, wherein the compound of the second aqueous solution forms a water-insoluble precipitate when reacted with the compound of the first aqueous solution;
    c) mixing the first aqueous solution with second aqueous solution to form an aqueous solution of reacted material;

d) forming a water-in-oil emulsion by passing the aqueous solution of reacted material through a microporous membrane into at least one organic solvent, whereby the hollow inorganic spheres having the uniform sphere size distribution are formed.

3. A process for producing inorganic spheres as defined in claim 2 further comprising the step of rendering the microporous membrane hydrophobic prior to step (d).

* * * * *